United States Patent [19]

van der Lely

[11] 4,207,948
[45] Jun. 17, 1980

[54] SOIL CULTIVATING IMPLEMENTS

[76] Inventor: Cornelis van der Lely, 7, Brüschenrain, Zug, Switzerland

[21] Appl. No.: 882,157

[22] Filed: Feb. 28, 1978

[30] Foreign Application Priority Data

Feb. 25, 1977 [NL] Netherlands ............ 7702015

[51] Int. Cl.² ............................................. A01B 33/06
[52] U.S. Cl. ............................................. 172/59
[58] Field of Search ............... 172/59, 111, 713, 522, 172/523, 526

[56] References Cited

U.S. PATENT DOCUMENTS

| 25,736 | 10/1859 | Hogle | 172/526 |
|---|---|---|---|
| 661,307 | 11/1900 | Darby | 172/59 |
| 3,667,551 | 6/1972 | Lely | 172/125 |
| 4,106,567 | 8/1978 | Lely | 172/59 |

FOREIGN PATENT DOCUMENTS

| 437136 | 11/1926 | Fed. Rep. of Germany | 172/713 |
|---|---|---|---|
| 1189675 | 3/1959 | France | 172/111 |
| 620157 | 3/1961 | Italy | 172/111 |
| 7511052 | 9/1975 | Netherlands | 172/59 |
| 847413 | 9/1960 | United Kingdom | 172/523 |

Primary Examiner—Richard J. Johnson

[57] ABSTRACT

A soil cultivating implement has a row of soil working members that are driven to rotate about upwardly extending axes. Each member includes a tine carrier and tines either in pairs or singly, are journalled for free rotation about further upwardly extending axes. The tines are positioned to the rears of their respective further axes of rotation and can perform rapid turning movements when the soil working members are rotated about the first axis of rotation. The tines can be strips that are angled to trail and deflect, depending on the condition of the ground being worked.

14 Claims, 15 Drawing Figures

SOIL CULTIVATING IMPLEMENTS

According to one aspect of the invention, there is provided a soil cultivating implement of the kind set forth, wherein pivot axis of a soil working element is with respect to the intended direction of rotation in advance of the upper part of said soil working element.

For a better understanding of the invention, and to show how the same may be carried into effect, reference will now be made, by way of example, to the accompanying drawings, in which.

Figure 1:
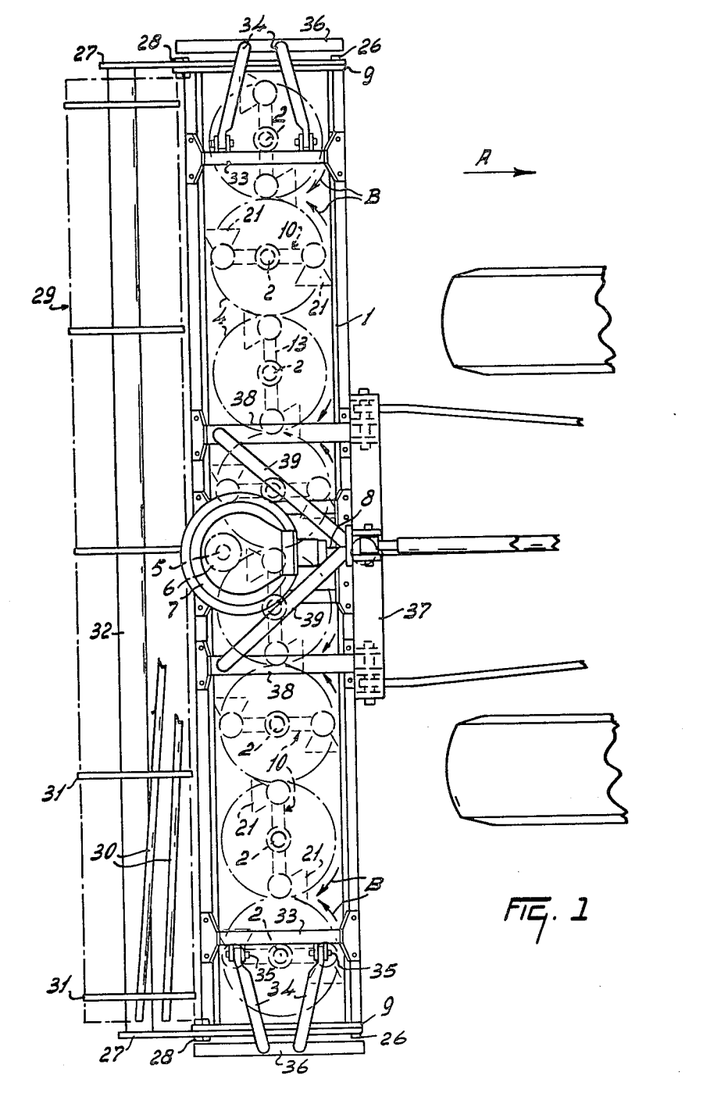
FIG. 1 is a somewhat diagrammatic plan view of a soil cultivating implement in accordance with the invention connected to the rear of an agricultural tractor.
Figure 4:
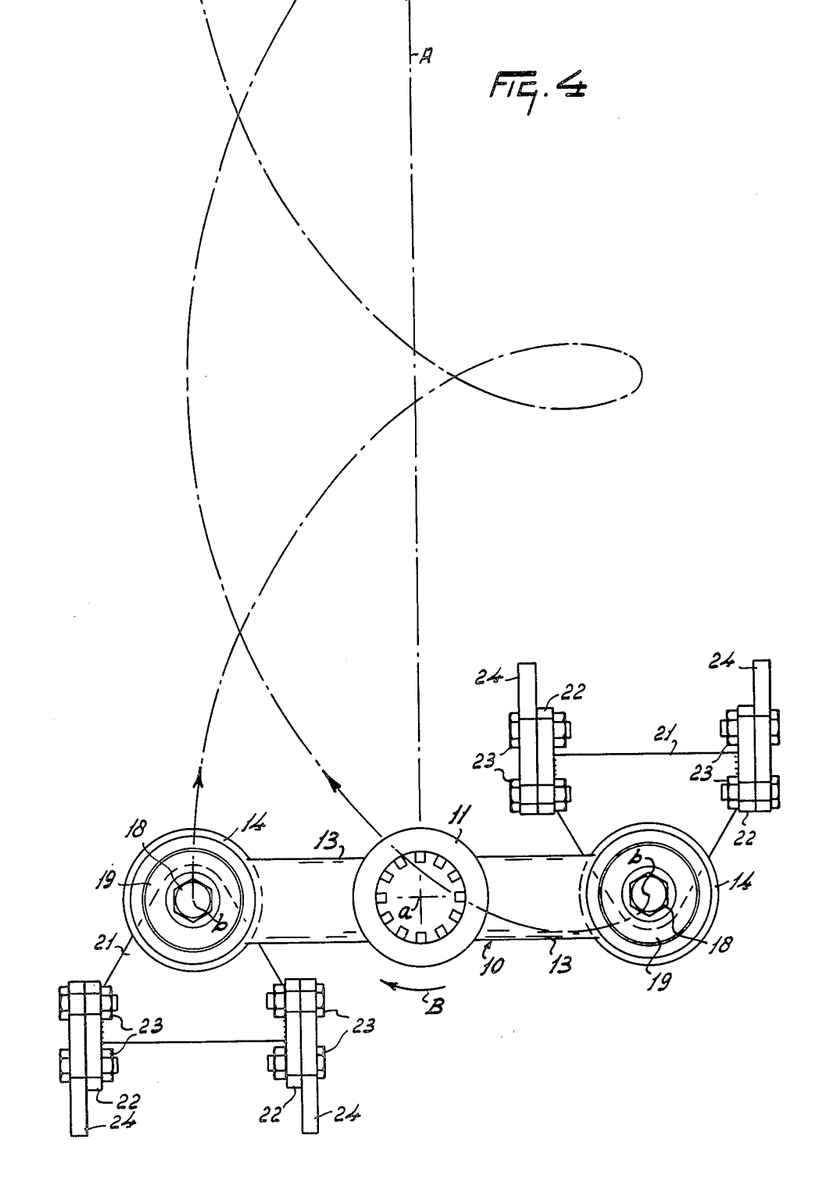
FIG. 4 is a view as seen in the direction indicated by an arrow IV in FIG. 2 and also diagrammatically illustrates the path of movement of said one of the soil working members of the implement when the latter is in operation.

Referring to FIGS. 1 to 4 of the accompanying drawings, the soil working implement that is illustrated therein has a frame which principally comprises a hollow box-section frame portion 1 that extends substantially horizontally transverse, and usually (as illustrated) substantially perpendicular, to the intended direction of operative travel of the implement which is indicated in FIGS. 1 and 4 by an arrow A. Eight substantially vertical, or at least upwardly extending, shafts 2 are rotatably mounted in the hollow frame portion 1 in a single row that extends parallel to the length (transverse to the direction A) of the frame portion 1, the eight parallel shafts 2 being regularly spaced apart from one another in said row in such a way that the longitudinal axes (axes of rotation) of two immediately neighbouring shafts 2 are substantially 375 millimeters apart from one another. Each shaft 2 projects downwardly from beneath the bottom of the hollow frame portion 1 and is there provided with a corresponding soil working member that is generally indicated by the reference 3. The embodiment which is being described comprises eight of the shafts 2 and soil working members 3 but it is emphasised that this number is by no means mandatory and that greater or lesser numbers of the parts 2 and 3 could equally well be provided in other embodiments. Each shaft 2 is splined inside the hollow frame portion 1, said splines co-operating with internal splines in the hub of a corresponding straight-toothed or spur-toothed pinion 4. The eight pinions 4 are of such sizes, and are so arranged inside the hollow frame portion 1, that the teeth of each of them are in mesh with those of the or each immediately neighbouring pinion 4 in the row of eight such pinions. As a consequence, each unit which comprises one of the pinions 4, the corresponding shaft 2 and the corresponding soil working member 3 will, during operation, revolve in the opposite direction to that of the or each immediately neighbouring similar unit, such intended directions of operative rotation being devoted throughout the drawings by arrows B.

A shaft 5 which extends substantially vertically parallel to the shafts 2 is rotatably mounted in the hollow frame portion 1 at a location substantially midway across the width of that frame portion and close to the rear thereof with respect to the direction A. The shaft 5 projects above the top of the hollow frame portion 1 but that part thereof which is located inside said frame portion carries a toothed pinion 6 whose teeth are in driving mesh with only one of the center pair of pinions 4, the pinions 4 being considerably larger in diameter than is the pinion 6. The upwardly projecting part of the shaft 5 extends into a gear box 7 which is mounted on top of the hollow frame portion 1 substantially midway along the length (in a direction transverse to the direction A) of said frame portion. Bevel pinions (not illustrated) inside the gear box 7 place the shaft 5 in driven connection with a rotary input shaft 8 of the gear box, said input shaft 8 extending substantially horizontally parallel to the direction A and having a splined or otherwise keyed end which projects forwardly from the front of that gear box to enable it to be placed in driven connection with the rear power take-off shaft of an agricultural tractor or other operating vehicle through the intermediary of a telescopic transmission shaft, which is of a construction that is known per se, having universal joints at its opposite ends. The opposite ends of the hollow frame portion 1 are closed by substantially vertical side plates 9 which extend parallel to one another and parallel or substantially parallel to the direction A.

Each of the eight (in this embodiment) rotary soil working members 3 comprises a substantially horizontally extending support or carrier 10 which is provided at its center with a downwardly tapering hub 11 having internal splines which co-operate with matching external splines on the end portion of the chosen co-operating shaft 2 that projects downwardly from beneath the hollow frame portion 1. Each shaft 2 is formed at its lowermost extremity with a short screwthreaded part, of reduced diameter, and a fastening nut 12, and usually an accompanying washer, co-operates therewith in the manner which can be seen in FIG. 2 of the drawings to prevent axial disengagement of the hub 11 concerned from said shaft 2. As illustrated, the nut 12 is preferably furnished with a split pin or with other known means which will prevent the nut from working loose when the implement is in use. Each of the carriers or supports 10 has two diametrically opposed straight arms 13 that project from opposite sides of the corresponding hub 11, the outer ends of the two arms 13 being integrally furnished with corresponding sleeve-like and substantially cylindrical holders 14. Actually, each holder 14 is of somewhat tapering formation towards its upper end and its disposition, with respect to the arm 13 to which it is integrally secured, is such that its upper end projects above the top of that arm 13 by a shorter distance than does the lower end thereof beneath the bottom of said arm 13 (see FIGS. 2 and 3). The longitudinal center lines or axes b of the two holders 14 of each soil working member 3 are parallel or substantially parallel to the longitudinal axis (axis of rotation) a of the corresponding shaft 2 and, as illustrated, are coplanar or substantially coplanar with the axis a.

the hollow interior of each sleeve-like holder 14 is stepped and receives, from the lower end, a corresponding stub shaft 17 whose longitudinal axis coincides with the longitudinal axis b of the sleeve 14 under consideration. Each such stub shaft 17 is turnably/rotatably received in the corresponding holder 14 with the aid of opposed lower and upper tapered roller bearings 15 and 16, said bearings 15 and 16 co-operating with internal steps of the holder 14 concerned and with stepped portions of the stub shaft 17 which they surround. Thus, the lower bearing 15 of each pair has an outer race whose upper end abuts against an internal step of the corresponding holder 14 while, similarly, the corresponding upper bearing 16 has an outer race whose lower end abuts against a further, but spaced, internal step of said holder 14. The upper end of each stub shaft 17 is formed with an internally screwthreaded axially extending blind bore and, when said stub shaft 17 is installed in its holder 14, the shank of a bolt 18 co-operates with said bore in fastening a screening hood or cap 19 thereto in such a position that said hood or cap 19 substantially closes the upper end of the open interior of the holder 14 concerned. It will be seen from FIG. 2 of the drawings that the head of each bolt 18 is recessed into the hood or cap 19 with which it co-operates and that a rotary seal is provided between each hood or cap 19 and the top of the underlying upper tapered roller bearing 16, it being remembered, of course, that the stub shafts 17 are turnable about the axes b inside the holders 14. The lower end of the opening through each holder 14 is closed by an annular cover plate 20 which surrounds a step of the stub shaft 17 concerned between that step and the mouth at the lower end of the respective holder 14. A diagrammatically illustrated rotary seal lies immediately above each cover plate 20 so as to extend between that cover plate and a location very close to the lower end of the corresponding lower tapered roller bearing 15. It will be noted from FIG. 2 of the drawings that the lower bearings 15 are a little greater in diameter than are the upper bearings 16. The inner edge of each annular cover plate 20 is fastened to the corresponding stub shaft 17 and the lower end of that stub shaft, in turn, is welded or otherwise rigidly secured to the upper surface of a corresponding support 21, which is in the form of a plate, said support 21 being of substantially isosceles triangular configuration and the stub shaft 17 being fastened thereto adjacent the rounded "apex" corner thereof (FIG. 4). Each support 21 is so disposed that its general plane is perpendicular or substantially perpendicular to the corresponding axis a. When the implement is in operation, the substantially isosceles triangular (in plan view) supports 21 occupy substantially the positions which are shown in the drawings in which the rounded "apex" corners thereof to which the stub shafts 17 are secured are foremost with respect to the corresponding directions of operative rotation B, the "base" edges of the supports 21 being rearmost relative to said directions B and thus behind the stub shafts 17 in those directions. The outer two corners of each support 21 are truncated and have parallel upwardly projecting lugs 22 welded or otherwise rigidly secured to them, said lugs 22 being shaped in the manner which can be seen best in FIG. 3 of the drawings and which is such that each of them projects behind the "base" edge of the corresponding support 21 with respect to the direction B concerned. Each lug 22 has the upper end of a corresponding soil working element 24 firmly but releasably secured to it by a pair of substantially horizontally disposed bolts 23, said bolts 23 being respectively above and below the general plane of the corresponding plate 21 with the "upper" bolt 23 in advance of the "lower" bolt 23 with respect to the direction B concerned. Each soil working elements 24 is in the form of a rectilinearly extending strip that is inclined downwardly, and rearwardly with respect to the direction B, at an angle of substantially 8° to an imaginary plane which contains the axis a of the corresponding shaft 2, from its upper to its lower end.

It will be seen from the drawings that the two elements 24 which correspond to each support 21 are in parallel or substantially parallel relationship with one another and that their upper ends are clamped, by the bolts 23, to the relatively remote sides of the corresponding lugs 22. Each element 24 has a leading edge, with respect to the corresponding direction B, which is bevelled to form a cutting edge 25, said leading cutting edge 25 being in parallel relationship with the rear edge of the same element 24 since said stripshaped elements are of constant width from substantially their upper to substantially their lower ends. In the embodiment which is being described in which each axis a and the corresponding pair of axes b are parallel or substantially parallel and coplanar or substantially coplanar, the plane to which the strip-shaped elements 24 of each soil working member 3 are inclined at angels of substantially 8° in the corresponding plane which contains, or substantially contains, the axis a and the axes b concerned. This relationship assumes that the supports 21 are disposed in substantially the positions thereof that are shown in FIGS. 1 to 4 of the drawings, such positions being the ones which the supports 21 and elements 24 will usually occupy when the implement is in use. It is noted that the lower end of the elements 24 extend perpendicularly with respect to the leading cutting edges 25 and rear edges of those elements so that, due to the inclination of said elements that has been discussed, the leading ends of said lower edges, with respect to the corresponding directions B, are at slightly lower levels in the soil during operation than are the rear ends of said lower edges.

The fronts of the frame portion side plates 9, with respect to the direction A, are provided with substantially horizontally aligned pivots 26 and arms 27 are turnable upwardly and downwardly about said pivots 26 alongside the respective plates 9. The arms 27 extend generally rearwardly, with respect to the direction A, from the pivots 26 and project beyond the rearmost edges of the side plates 9. The rear edges of the side plates 9 have a considerable vertical extent and are formed with curved rows of holes which holes are so disposed as to be equidistant from the axis which is defined by the pivots 26. The arms 27 are formed with single holes at the same distance from said axis and bolts 28 are provided for entry through the holes in the arms 27 and chosen ones of the holes in the side plates 9 so that, when said bolts 28 are tightened, the arms 27 are retained firmly but releasably in corresponding angular settings about the substantially horizontal axis which is defined by the pivots 26. A rotatable supporting member of the implement, in the form of an open-work cage formation ground roller 29, is mounted in a freely rotatable manner between the rearmost ends of the arms 27 and extends throughout substantially the same working width as the row of eight soil working members 3. The roller 29 comprises a central, preferably tubular, axially extending support 32 to which a plurality, such as five, of support plates 31 are secured at regularly spaced apart intervals along the axial length of the roller 29. Two of said support plates 31 are located close to the opposite ends of the central support 32 and said support plates 31 are substantially vertically parallel to one another and parallel or substantially parallel to the direction A. The support plates 31 are formed, close to their peripheries, with circular rows of regularly spaced apart holes and elongate elements 30 are passed lengthwise through those holes so as to define the greater part of the open-work curved surface of the roller 29, said elements 30 being of tubular or rodshaped formation and preferably, as illustrated, being wound helically around the axis of rotation of the roller 29 to some extent. The level of the axis of rotation of the roller 29 which is chosen relative to the level of the hollow frame portion 1, by entering the bolts 28 in appropriate holes in the end plates 9, is a principal factor in determining the depth of penetration of the soil working elements 24 of the members 3 into the ground when the implement is in operation and the roller 29 also serves a secondary soil working function in levelling and gently compressing the soil behind the members 3 with a crushing action upon any lumps of soil that may have been left upon the ground surface.

The top of the hollow frame portion 1 is provided, at short distances inwardly from the opposite ends of that frame portion, with supports 33 that extend substantially horizontally parallel to the direction A. Each support 33 carries two corresponding pairs of lugs that both project from said support towards the neighbouring end of the hollow frame portion 1, the two pairs of lugs being spaced apart from one another along the corresponding support 33. Each pair of lugs supports a corresponding pivot pin 35 that is substantially horizontally parallel to the direction A and each pivot pin 35 has one end of a corresponding arm 34 turnably mounted thereon between the corresponding pair of lugs. The two arms 34 that correspond to each support 33 converge towards one another (as seen in FIG. 1) away from the support 33 concerned and extend over the upper edge of the respective end plate 9. Said arms 34 are then bent over downwardly and their lower ends are secured to a corresponding shield plate 36 which extends substantially horizontally parallel to the direction A. The lower edges of the shield plates 36 are shaped to slide forwardly over the ground surface in the direction A, and rearwardly with respect to that direction during manoeuvring, and each plate 36 is turnable upwardly and downwardly about the axis that is defined by the corresponding pair of pivot pins 35 to match undulations in the surface of the land that are met with during operative progress in the direction A. The shield plates co-operate with the soil working members 3 at the opposite ends of the row of eight such members to ensure that the soil is well worked at the edges of the broad strip of land which is cultivated by the implement, said plates 36 minimising ridging at the edges of the broad strip and also acting to prevent the rapidly rotating members 3 from flinging stones and other potentially dangerous objects laterally of the path of travel of the implement. Two supports 38 extend substantially horizontal parallel to the direction A on top of the hollow frame portion 1 at short distances from the midpoint of that frame portion, the leading ends of said supports 38 being secured to the bottom of a coupling member or trestle 37 of the implement that is of generally triangular configuration as seen in front or rear elevation. The coupling member or trestle 37 is thus located at the front of the frame portion 1, with respect to the direction A, at a location which is substantially midway between the general planes of the two frame portion end plates 9. Two downwardly and rearwardly (with respect to the direction A) divergent tie beams 39 strengtheningly interconnect substantially the apex of the coupling member or trestle 37 and locations which are close to the rearmost ends of the two parallel supports 38.

In the use of the soil cultivating implement which has been described with reference to FIGS. 1 to 4 of the drawings, its coupling member or trestle 37 is connected to the rear ends of the upper and lowering lifting links of a three-point lifting device or hitch at the rear of an agricultural tractor or other operating vehicle in the generally known manner which is illustrated in outline in FIG. 1 of the drawings and the forwardly projecting rotary input shaft 8 of the gear box 7 is placed in driven connection with the rear power take-off shaft of the same agricultural tractor or other operating vehicle by way the known telescopic transmission shaft which has universal joints at its opposite ends. The maximum depth to which the soil working elements 24 of the members 3 will be able to penetrate into the ground will have been set, before work commences, by moving the roller 29 bodily upwardly or downwardly relative to the frame portion 1 in the manner described above, employing the bolts 28 to maintain any chosen depth setting as long as may be required. As the implement makes operative progress in the direction A over land that is to be cultivated, the rotary drive which is applied to the input shaft 8 will cause the shafts 2, and thus the soil working members 3, to be rotated in the directions B. The elements 24 occupy substantially the positions that can be seen in FIGS. 2 to 4 of the drawings during a cultivating operation and it will be noted that, since each soil working member 3 has a working width which is a little greater than the distance between immediately neighbouring axes a, the eight strips of soil that are worked by the individual members 3 overlap one another to form a single broad strip of land which has a width, in the case of the embodiment that is being described, of substantially 3 meters. The resistance to progress of the elements 24 through the soil will, of course, vary more or less continuously having regard to the density of the soil and to the occurrence of obstacles, such as stones, that are located therein. Owing to the free turnability of each support 21 about a corresponding one of the axes b, the corresponding pair of elements 24 will, at any instant, tend to adopt a position in which the resistance to their progress through the soil is at a minimum. The axes b are, it will be remembered, parallel or substantially parallel to the axes a and each pair of elements 24 have their upper ends located rearwardly, with respect to the corresponding direction B, from the respective axis b. The general planes of the strip-shaped elements 24 extend substantially parallel to the corresponding axes of rotation a, the distance by which the upper ends of the two elements 24 of each pair are spaced rearwardly (in the direction B concerned) from the corresponding axis b preferably being equal or substantially equal to the width of one of the broad surfaces of one of the elements 24 concerned. In the embodiment which is being described, this width preferably has a magnitude of substantially 60 millimeters while the length of each element 24 has a magnitude of substantially 300 millimeters. The distance between the two parallel or substantially parallel axes b which correspond to each soil working membmer 3 preferably also has a magnitude of substantially 300 millimeters.

Figures 2, 3:
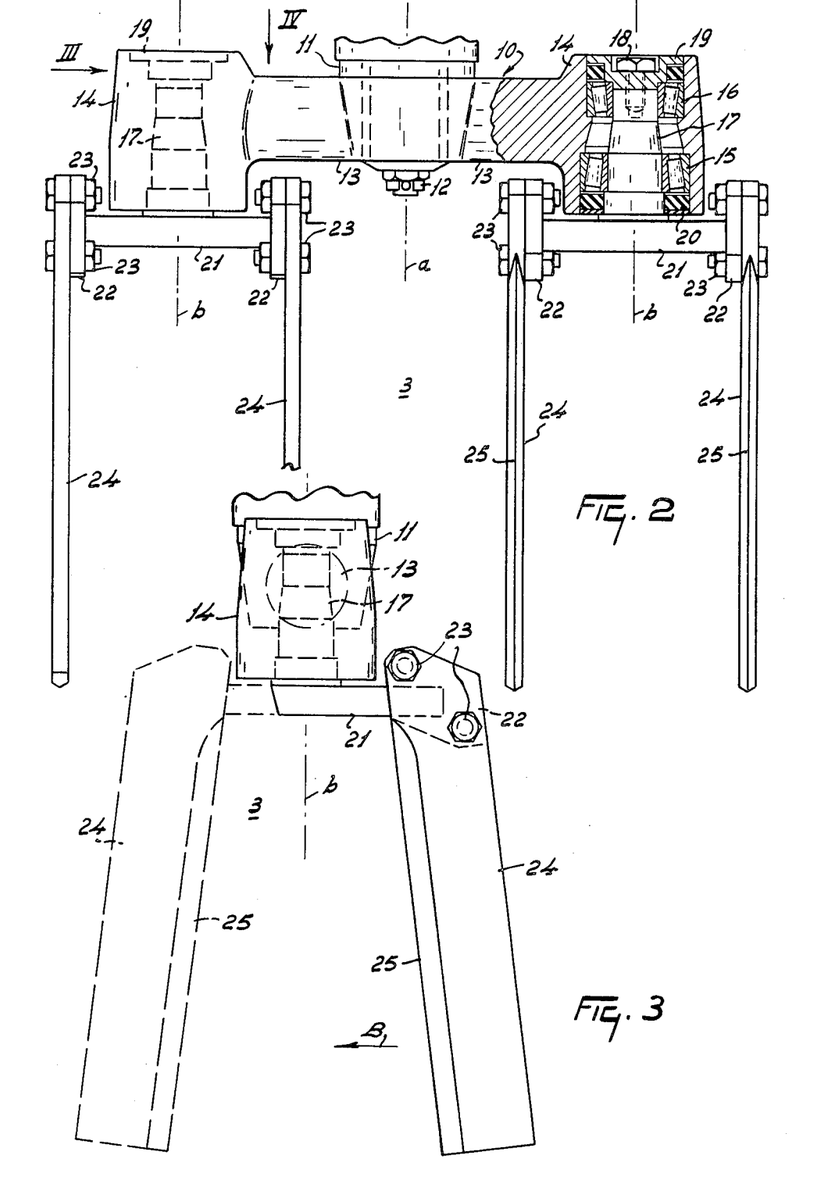
FIG. 2 is a part-sectional side elevation, to an enlarged scale, showing the construction and arrangement of one of a plurality of soil working members of the implement in greater detail.
FIG. 3 is a view as seen in the direction indicated by the arrow III in FIG. 2.

In the embodiment which has been described above, the axis b about which each support 21 and the corresponding pair of soil working elements 24 is freely turnable through 360° is located midway between the fastenings of the two elements 24 concerned to the cooperating lugs 22 when the assembly is viewed in the intended direction of operative rotation B of the corresponding soil working member 3 (i.e. as seen in FIG. 2 of the drawings). The paths that are described by the two axes b that correspond to one soil working member 3 during operative progress in the direction A are indicated diagrammatically in FIG. 4 of the drawings. It will be seen that these paths include tight loops that are substantially regularly spaced apart from one another in the direction A since said paths are compounded from the substantially rectilinear motion in the direction A and the rotary motion in the direction B. It will be appearent that, at the locations of said tight loops, the elements 24 concerned are required to perform rapid turning movements in the soil and the construction which has been described readily allows this which is conducive to minimising the power required to drive the soil working members 3. The top of bottom trailing disposition of the element 24 relative to the directions B contributes to the ready turnability of those elements in the soil since the trailing disposition facilitates their passage through the ground. The distance, in the direction A, between the successive tight loops is, of course, dependent upon both the speed of travel in the direction A and the speed of rotation in the direction B of the members 3. When cultivation of heavy soil is necessary, the elements 24 will crumble that soil to a satisfactory extent since, because of their free pivotability about the axes b, the cutting operation which they perform is not a forcible one and the earth is able principally to crumble along its own natural lines of fracture. It is noted that, instead of providing two soil working elements 24 that are turnable together about each axis b, it is possible to provide a single soil working element in respect of each stub shaft 17.

Figures 5, 7:
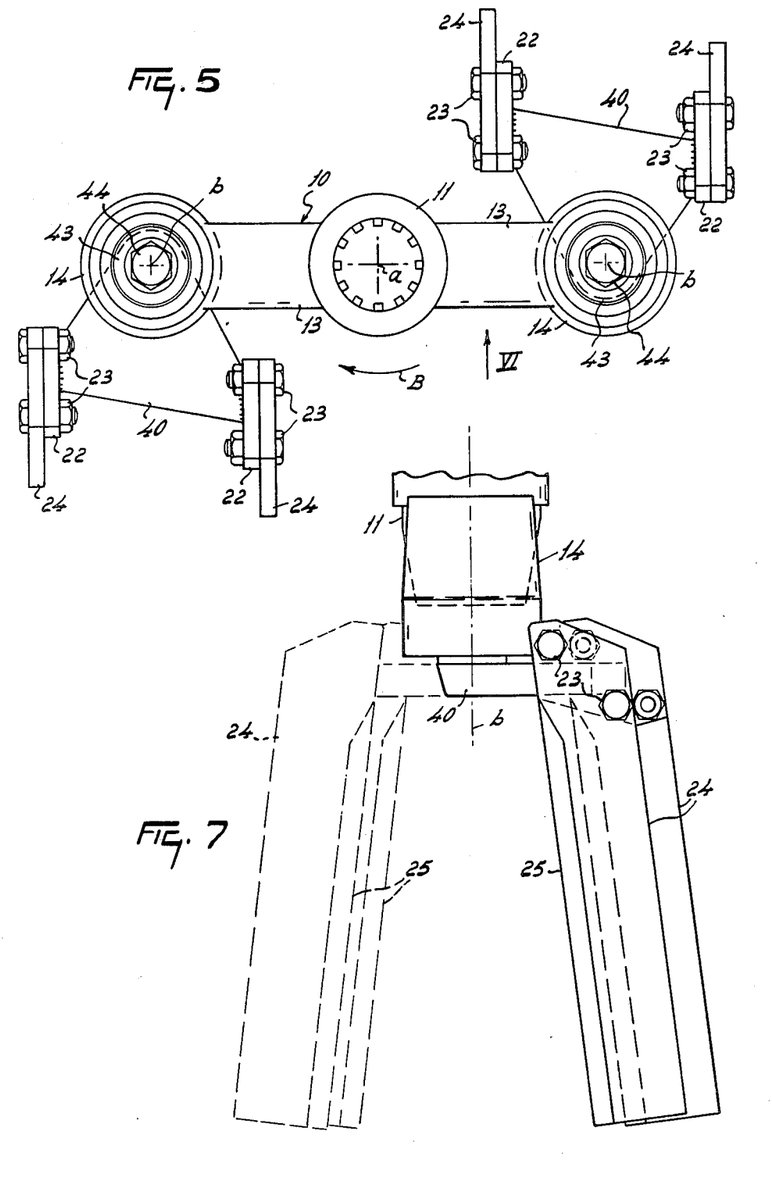
FIG. 5 is again a view as seen in the direction indicated by the arrow IV in FIG. 2 but illustrates an alternative soil working member construction.
FIG. 7 is an elevation as seen in the direction indicated by an arrow VII in FIG. 6.
Figure 6:
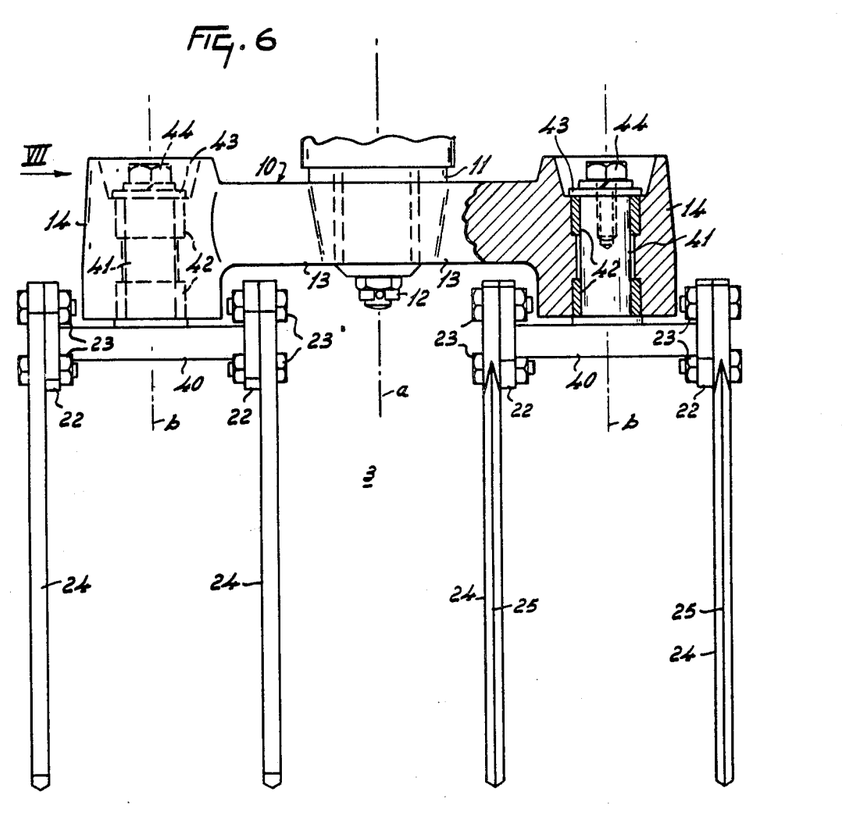
FIG. 6 is a part-sectional elevation as seen in the direction indicated by an arrow VI in FIG. 5.

FIGS. 5 to 7 of the drawings illustrate an alternative embodiment in which, however, parts that are similar, or identical, to parts which have already been described above in connection with FIGS. 1 to 4 of the drawings will be indicated by the same references as are used in those Figures and will not be described again in detail. In the embodiment of FIGS. 5 to 7 of the drawings, the substantially isosceles triangular supports 21 are replaced by other substantially triangular supports 40 which are not, however, of substantially isosceles configuration. The two soil working elements 24 that correspond to each axis b are, once again, mounted at the two truncated rear corners of each support 40, with respect to the direction of rotation B concerned, but, due to the shapes of the supports 40, the elements 24 which are furthest from the axes of rotation a are in advance of the elements 24 which are closest to that axis with respect to the corresponding directions B. The arrangement is such that, as seen in side elevation (FIG. 7), the leading cutting edge 25 of each foremost element 24 is spaced from the corresponding axis b (at any chosen horizontal level) by substantially two-thirds of the distance by which the leading cutting edge 25 of the companion "rear" element 24 is spaced from that axis b at the same horizontal level. The substantially triangular supports 40, which are in the form of plates, are so shaped that the "base" edges thereof, which are normally rearmost with respect to the corresponding directions B, are in non-parallel relationship with imaginary planes that contain the axes of rotation a and the two axes b which correspond to each member 3, the dispositions of said rear edges being such as to match the forward and rearward arrangements of the corresponding elements 24 with respect to the directions of rotation B concerned. This arrangement ensures that, during the passage of the elements 24 of the soil working member 3 through the soil, the constantly varying resistance to progress which is encountered by those elements causes said elements to rock more or less continuously about the corresponding axes b, this further improving the crumbling effect of the implement when used on heavy soil.

The embodiment of FIGS. 5 to 7 of the drawings employs stub shafts 41 in place of the previously described stub shafts 17, said stub shafts 41 being free of steps throughout their lengths except at their lowermost ends which adjoin the corresponding supports 40. The stub shafts 41 are freely turnable in upper and lower plain bearings 42 whose outer surfaces are lodged in corresponding enlarged diameter portions of the central bores through the corresponding holders 14. Each lower plain bearing 42 extends between the step at the lower end of the stub shaft 41 concerned and the lower end of a substantially central reduced diameter shoulder of the bore through the corresponding holder 14 while each upper plain bearing 42 extends between the upper end of said shoulder and the lower surface of a washer 43 that is mounted at the upper end of the associated stub shaft 41 by a bolt 44 screwed axially into a blind bore of said stub shaft, a resilient anti-loosening washer preferably also being provided beneath the head of each bolt 44 as shown best in FIG. 6 of the drawings. It can also be seen in FIG. 6 that the heads of the bolts 44, the washers 43 and the resilient washers that have just been mentioned are all disposed within a downwardly tapering recess at the top of each holder 14.

Figures 8, 9, 10:
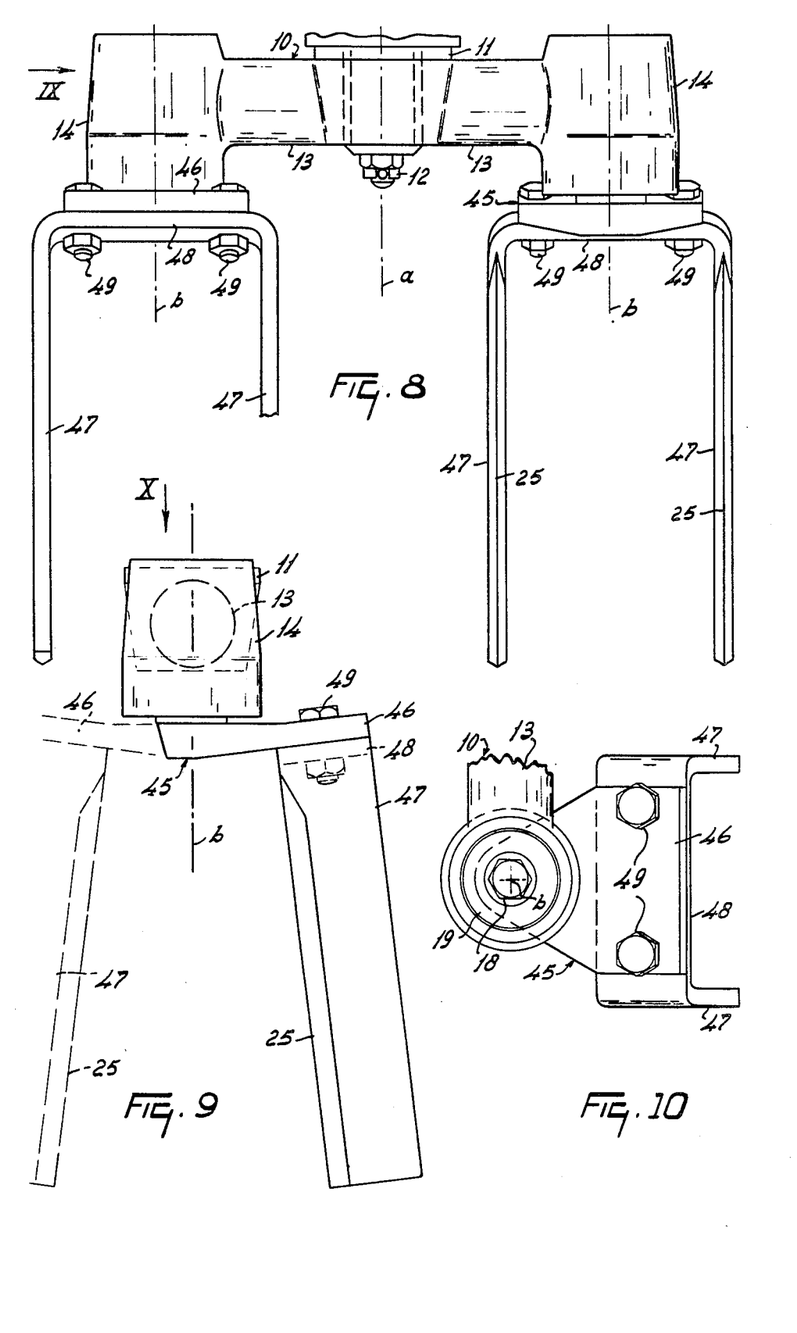
FIG. 8 is an elevation, from the same standpoint as FIGS. 2 and 6, illustrating another soil working member construction.
FIG. 9 is a view as seen in the direction indicated by an arrow IX in FIG. 8.
FIG. 10 is a view as seen in the direction indicated by an arrow X in FIG. 9.

In the embodiment of FIGS. 8 to 10 of the drawings, in which parts that have already been described are again denoted by the references that have previously been employed, supports 45, in the form of plates, are used instead of the previously described supports 21 and 40 and it will be seen that each support 45 progressively increases in width from the lowermost end of the corresponding stub shaft 17 up to the leading edge, with respect to the corresponding direction B, of an oblong support portion 46. As can be seen in FIG. 9, each oblong support portion 46 is tilted upwardly and rearwardly at a few degrees to the horizontal from its leading to its rear edge, with respect to the corresponding direction B, the whole support 45 decreasing marginally in thickness from front to rear except in the portion 46 thereof which is of substantially constant thickness throughout. In this embodiment, pairs of soil working elements 47 are provided, the upper ends of the two elements 47 of each pair being integrally interconnected by a fastening portion 48 that is firmly but releasably secured to the lower surface of the oblong portion 46 of the respective support 45 by two bolts 49.

Figure 11:
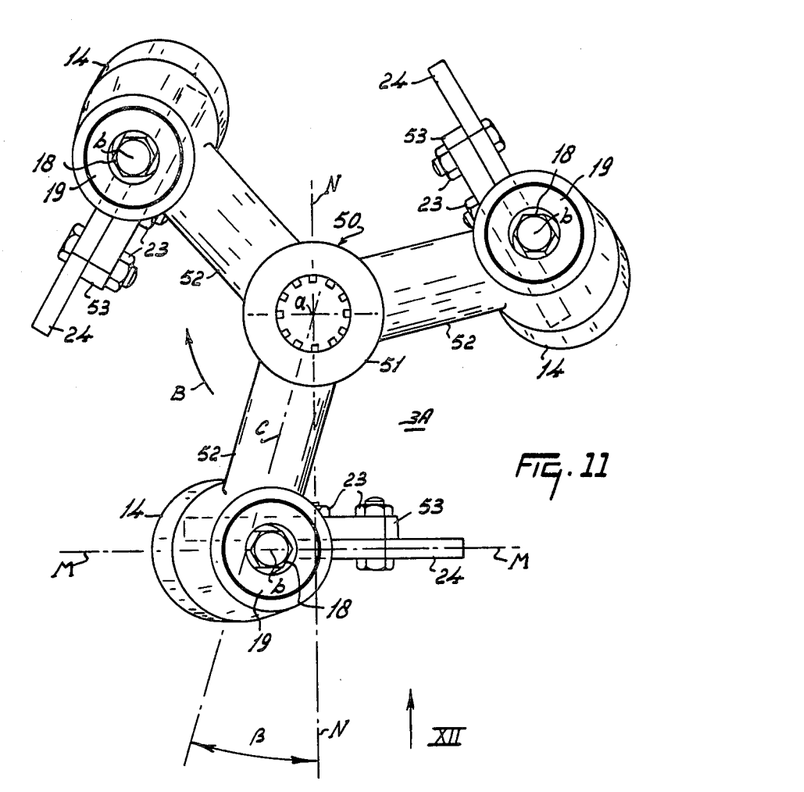
FIG. 11 is a plan view illustrating a further alternative soil working member construction.
Figure 12:
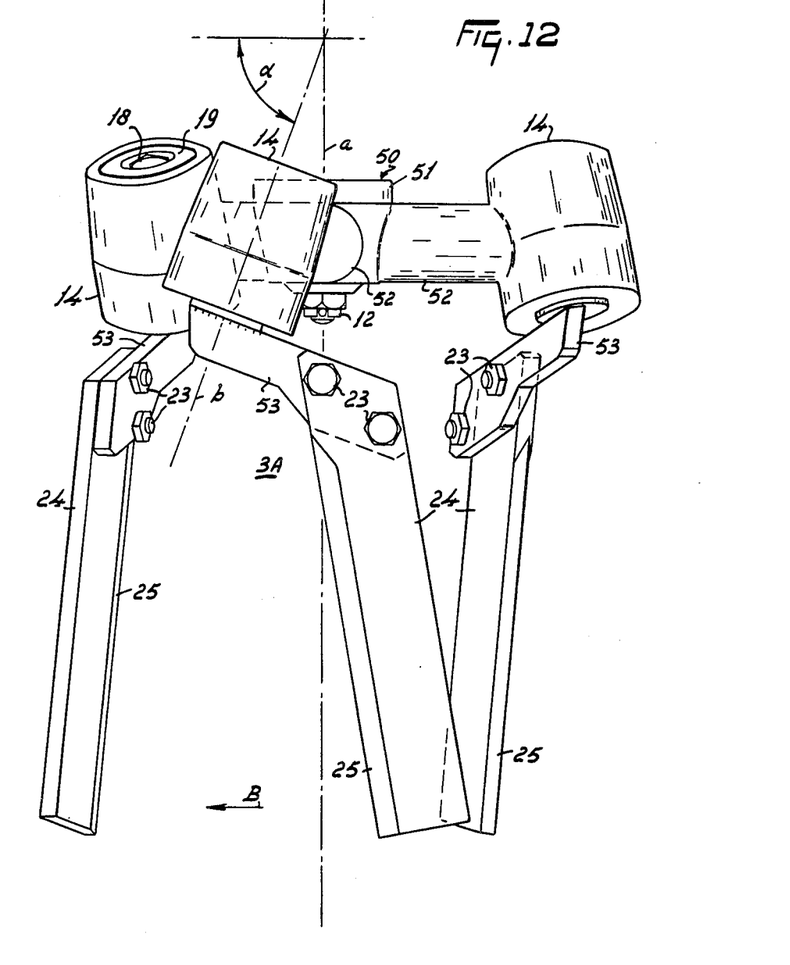
FIG. 12 is an elevation as seen in the direction indicated by an arrow XII in FIG. 11.

FIGS. 11 and 12 of the drawings illustrate an embodiment in which soil working member 3A are provided, each member 3A comprising a support or carrier 50 having a central internally splined hub 51 that is firmly but releasably secured to the downwardly projecting end of a corresponding one of the shafts 2 in substantially the same manner as has already been described above in connection with FIGS. 1 to 4 of the drawings. Each carrier or support 50 comprises three straight arms 52 which radiate from the corresponding hub 51 (and thus from the corresponding axis of rotation a) at angles of 120° and substantially 120° about that axis. The three arms 52 of each support or carrier 50 are of equal lengths and holders 14 which are identical or substantially identical in construction to the holders 14 that have been described above are integrally, or rigidly, mounted at the outermost ends of the arms. Each holder 14 has one of the previously described stub shafts 17 mounted therein so as to be freely turnable about an axis b, which substantially coincides with the longitudinal axis of the holder 14 concerned, in the same manner as has been described above with particular reference to FIG. 2 of the drawings. However, in this embodiment, each holder 14 is so mounted that the corresponding axis b is inclined downwardly and forwardly with respect to the corresponding direction B at an angle $\alpha$ (FIG. 12) to an imaginary substantially horizontal plane which is perpendicular to the axis of rotation a of the soil working member 3A concerned. Each stub shaft 17 and thus the corresponding axis b (so far as it extends within the respective holder 14) is located in advance, in the direction B, of a plane N—N (FIG. 11) which contains the axis of rotation a of the member 3A concerned and conveniently but not essentially, the longitudinal axis of the upper leading fastening bolt 23 of the corresponding soil working element 24. The plane N—N is perpendicular to a corresponding plane M—M (FIG. 11) which contains the axis b under discussion and that is parallel to the axis of rotation a of the respective soil working member 3A. A line C which substantially coincides with the longitudinal axis of the arm 52 that corresponds to the axis b under discussion and that intersects said axis b in the holder 14 concerned is in advance of the plane N—N with respect to the direction of rotation B and is inclined to that plane N—N at an angle $\beta$ which advantageously has a magnitude of between 15° and 20°, inclusive.

The lowermost end of each stub shaft 17 projects to a location just beneath the bottom of the corresponding holder 14 and there has an upper edge of a support 53, in the form of a plate, welded or otherwise rigidly secured to it. Each support 53 usually extends downwardly and rearwardly with respect to the corresponding direction B from the stub shaft 17 concerned and is of increased vertical extent towards its lowermost and rearmost end (see FIG. 12). A comparison between FIGS. 12 and 3 of the drawings will show that the upper end of each strip-shaped soil working element 24 is fastened to the rearward enlarged portion of each support 53 by a pair of the bolts 23 that are arranged, with respect to the direction B, in much the same way as are said bolts 23 in the embodiment of FIGS. 1 to 4 of the drawing with respect to the lugs 22. Each element 24 is again inclined downwardly and rearwardly from top to bottom so as to trail with respect to the direction B and each element 24 has its longitudinal axis inclined to the corresponding plane N—N at an angle which advantageously has a magnitude of substantially 10°.

When using a soil cultivating implement having soil working members 3A that are in accordance with FIGS. 11 and 12 of the drawings, the elements 24 usually occupy substantially the positions thereof that are shown in those Figures. Due to the significant inclination of the axes b to the vertical, any element 24 that is deflected by an obstacle or the like that it may meet in the soil moves upwardly to some extent as it turns about the axis b concerned. This can be a considerable advantage in avoiding damage to the elements 24, particularly when the implement is used in the cultivation of soil that contains an above average quantity of stones.

Figure 13:
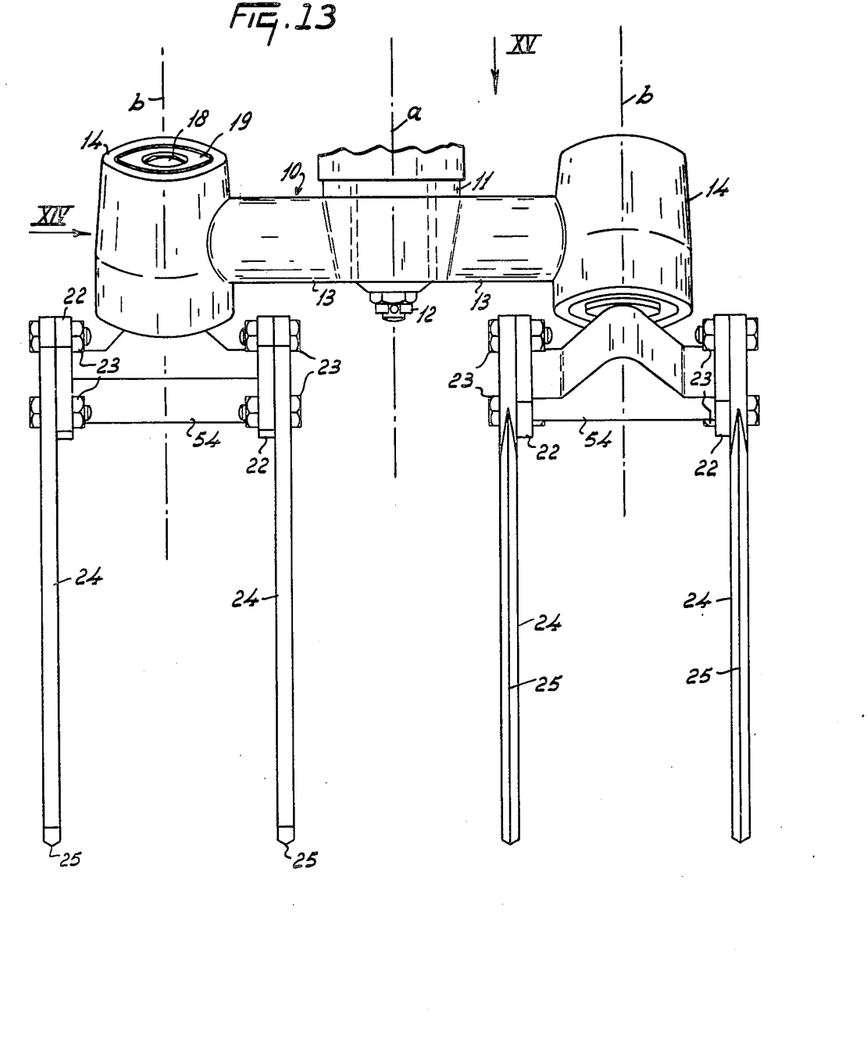
FIG. 13 is an elevation, from the same standpoint as FIGS. 2, 6 and 8, and illustrates a further alternative soil working member construction.
Figures 14, 15:
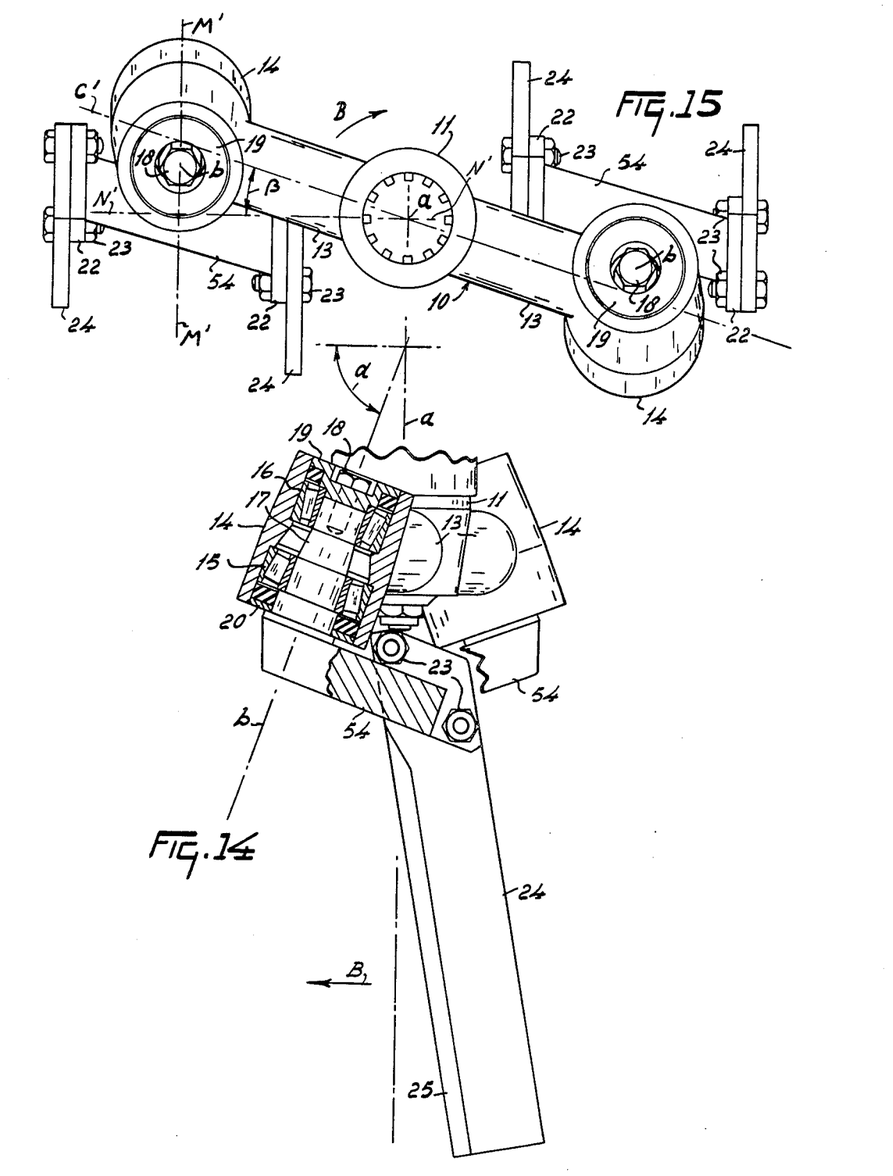
FIG. 14 is a part-sectional elevation as seen in the direction indicated by an arrow XIV in FIG. 13.
FIG. 15 is a view as seen in the direction indicated by an arrow XV in FIG. 13.

FIGS. 13 to 15 of the drawings illustrate a further alternative soil working member in which, once again, parts that have already been described are indicated by the same reference as have been employed above. It will be evident that the illustrated soil working member has the same basic construction as do the members of FIGS. 1 to 10 of the drawings, said member being firmly but releasably secured to a lower and region of a corresponding one of the shafts 2 as described above. Two of the previously described holders 14 are again integrally, or at least rigidly, disposed at the outer ends of the arms 13 of the support or carrier 10 but, in contradistinction to the embodiments of FIGS. 1 to 10 of the drawings, their arrangement is such that the substantially coincident axes b of the holders 14 themselves and of the stub shafts 17 that are freely turnably mounted therein are not parallel, or substantially parallel, to the corresponding axis of rotation a but are significantly inclined thereto. Each holder 14 is so disposed that it lies substantially wholly in advance, in the intended direction of operative rotation B, of a plane N'—N' that contains the axis of rotation a and that is perpendicular to a second plane M'—M' which contains the axis b of the holder 14 and stub shaft 17 concerned, the plane M'—M' being parallel to the axis of rotation a (see FIG. 15). In a similar manner to the embodiment of FIGS. 11 and 12 of the drawings, a line C' which perpendicularly intersects the axis of rotation a and also the axis b which corresponds to the holder 14 under consideration, at a location inside that holder, is inclined to the plane N'—N', at the axis a by an angle $\beta$ which advantageously has a magnitude of between 15° and 20°, inclusive. The line C' substantially, if not exactly, coincides with the common longitudinal axis of the two arms 13 of the support or carrier 10 of the soil working member concerned.

The lowermost end of each stub shaft 17 is welded or otherwise rigidly secured to a support 54, in the form of a plate, the shapes of the supports 54 being illustrated in FIGS. 13 to 15 of the drawings. It will be seen that the supports 54 are so shaped that the previously described strip-shaped soil working elements 24 which are furthest from the corresponding axis of rotation a, at least when the parts occupy the positions that are shown in FIGS. 13 to 15, are further in advance, with respect to the corresponding direction of operative rotation B, then are the companion elements 24 of each pair which are nearest to the corresponding axes of rotation a under the same circumstances as are illustrated in FIGS. 13 to 15. The supports 54 are provided with the previously described lugs 22, which are arranged in parallel relationship at the opposite sides or ends of the supports 54, the upper leading, with respect to the direction B, ends of the elements 24 being secured to the lugs 22 by pairs of the bolts 23. It will be appreciated that the disposition of each pair of elements 24 is basically similar to that in the embodiment of FIGS. 5 to 7 of the drawings so that, when the implement is furnished with soil working members in accordance with FIGS. 13 to 15 of the drawings, it will operate in much the same way as has been described above for the embodiment of FIGS. 5 to 7 except that, since each axis b is inclined at an angle α (FIG. 14) to a substantially horizontal plane which is perpendicular to the axis of rotation a concerned, at least one of the two elements 24 of each pair will be displaced upwardly, as well as laterally, upon meeting an obstacle in the soil or otherwise being subject to an exceptionally high resistance to its progress therethrough. If a deflection of more than a few degrees about the axis b is involved, both elements 24 of each pair will be displaced upwardly as well as laterally. Thus, in this respect, the embodiment of FIGS. 13 to 15 of the drawings operates in a similar manner to the embodiment of FIGS. 11 and 12 of the drawings, the angle α again advantageously having a magnitude of substantially 70°. Accordingly, in the use of the implement when equippped with soil working members in accordance with FIGS. 13 to 15 of the drawings, the crumbling effect upon the soil, and particularly upon heavy soil, will be enhanced by virtue of the irregular rocking movement of the pairs of elements 24 about the corresponding axes b, said pairs of elements being deflected upwardly in the soil upon one or both of the elements meeting embedded stones or other obstacles.

With all of the embodiments that have been described, the strip-shaped soil working elements 24 are freely pivotable/turnable through 360° about the corresponding axes b so that they can readily turn in the soil and execute movements such as those which are required at the tight loops that have been briefly described above with particular reference to FIG. 4 of the drawings. The result is that less power is required for the operation of each soil working members. Even though the elements 24 have leading cutting edges 25 and are therefore of blade-like formation, it has been found that the free pivotability/turnability thereof about the axes b which is provided enables those elements 24 to produce an entirely satisfactory crumbling, rather than slicing, action, even in heavy soil, the soil tending to break up principally along its own natural lines of fracture.

Although certain features of the various soil cultivating implement embodiments that have been described and/or that are illustrated in the accompanying drawings will be set forth in the following claims as inventive features, it is emphasised that the invention is not necessarily limited to those features and that it includes within its scope each of the parts of each soil cultivating implement embodiment that has been described, and/or that is illustrated in the accompanying drawings, both individually and in various combinations.

What we claim is:

1. A soil cultivating implement comprising a frame and at least one soil working member being rotatably mounted on a shaft supported by said frame, said member being rotatable about a first upwardly extending axis defined by said shaft and driving means connected to rotate said member, said member comprising a carrier on said shaft and downwardly extending elongated tine means in holders at the outer ends of arms of said carrier, each time means being journalled in a corresponding holder for free rotation about a second axis that is inclined to the vertical, and said second axis extending downwardly and forwardly with respect to the normal direction of rotation of said member, the longitudinal axis of said tine means being inclined downwardly and rearwardly from top to bottom and said tine means occupying a trailing position with respect to a respective arm during travel, whereby said tine means can deflect about the second axis and move upwardly at it turns about that axis.

2. An implement as claimed in claim 1, wherein said elements are elongated strips having broad sides that extend substantially in the direction of rotation of said member.

3. An implement as claimed in claim 2, wherein each element is elongated and substantially straight, each of said elements having front and rear edges that are substantially parallel to one another.

4. An implement as claimed in claim 1, wherein said carrier comprises three arms and each arm mounts a corresponding tine element that is journalled in the holder of that arm.

5. An implement as claimed in claim 4, wherein the corresponding axis of each tine means is defined by the longitudinal axis of a stub shaft that is journalled in a respective holder of said carrier.

6. An implement as claimed in claim 5, wherein said stub shaft is journalled in said holder with two bearings that are vertically spaced apart.

7. An implement as claimed in claim 6, wherein said bearings are tapered roller bearings having different diameters.

8. An implement as claimed in claim 6, wherein the lower of said bearings is larger in diameter than is the upper bearing.

9. An implement as claimed in claim 4, wherein each element is secured in a respective holder, substantially all of said holder being positioned in advance of a first plane which contains the axis of rotation of said member and that is perpendicular to a further plane which contains the corresponding upwardly extending axis of the element.

10. An implement as claimed in claim 8, wherein a line that is perpendicular to the first axis of rotation and that intersects the corresponding axis of rotation of one element is inclined at an angle of between 15° and 20° and is parallel to said first axis.

11. An implement as claimed in claim 1, wherein said carrier mounts at least one pair of soil working tine elements that is rotatable about said second axis, the two elements of said pair occupying a position about said second axis in which tops of the elements are spaced at different distances from said first axis.

12. An implement as claimed in claim 1, wherein said tine means comprises a plurality of elements and the top of each element is connected to a corresponding support by two bolts that are positioned obliquely, one above the other.

13. An implement as claimed in claim 1, wherein each holder mounts a pair of elongated elements which are freely turnable about a common further axis.

14. A soil cultivating implement comprising a frame and at least one soil working member being rotatably mounted on a shaft supported by said frame, said member being rotatable about a first upwardly extending axis defined by said shaft and driving means connected to rotate said member, said member comprising a carrier on said shaft and downwardly extending elongated tine elements at the outer ends of resepective arms of said carrier, each tine being journalled in a corresponding holder for free rotation about a second axis that is inclined to the vertical downwardly and forwardly with respect to the normal direction of rotation of said member, the longitudinal axis of each element being inclined downwardly and rearwardly from top to bottom and said element occupying a trailing position with respect to its respective arm during travel, whereby said element can deflect about the second axis and move upwardly as it turns about the axis.

* * * * *